United States Patent

[11] 3,569,693

| [72] | Inventors | Gerhard Lindae<br>Leonberg;<br>Richard Mueller, Stuttgart; Helmut<br>Gaissert, Pforzheim, Germany |
|---|---|---|
| [21] | Appl. No. | 817,375 |
| [22] | Filed | Apr. 18, 1969 |
| [45] | Patented | Mar. 9, 1971 |
| [73] | Assignee | Robert Bosch G.m.b.H.<br>Stuttgart, Germany |
| [32] | Priority | Apr. 20, 1968 |
| [33] | | Germany |
| [31] | | P 17 72 256.4 |

[54] HEADLIGHT FOR AUTOMOTIVE VEHICLES
10 Claims, 3 Drawing Figs.

[52] U.S. Cl..................................................... 240/41.35,
240/7.1, 313/113
[51] Int. Cl..................................................... F21v 7/09

[50] Field of Search.......................................... 240/41.35,
41.35 (A), 41.35 (D), 7.1, 41.37; 313/113

[56] References Cited
UNITED STATES PATENTS

| 3,206,595 | 9/1965 | Lollert......................... | 313/113X |
| 3,317,772 | 5/1967 | Lindae......................... | 240/41.35X |
| 3,493,806 | 2/1970 | Jacobs et al. ................. | 313/113 |

Primary Examiner—Samuel S. Matthews
Assistant Examiner—Richard L. Moses
Attorney—Michael S. Striker ABSTRACT: The low beam filament of a headlight for automotive vehicles is flanked from below and at both sides by a glare-eliminating light reflecting shield having a specific cross-sectional configuration in a plane at right angles to the optical axis of the reflector as well as in a plane which includes the optical axis. The shield has a projection which is located between the low beam filament and the high beam filament.

PATENTED MAR 9 1971 3,569,693

INVENTORS
Richard MÜLLER
Gerhard LINDAE
Helmut GAISSERT

By

*Michael S. Striker* their ATTORNEY

HEADLIGHT FOR AUTOMOTIVE VEHICLES

BACKGROUND OF THE INVENTION

The present invention relates to improvements in headlights for automotive vehicles or the like, and more particularly to improvements in means for increasing the intensity of low beam light in such headlights without generation of glare to oncoming traffic.

It is already known to provide a headlight with a shield which flanks portions of the low beam filament to reduce the likelihood of glare. The configuration of shields is an important factor which influences the quality of low beam light. If the configuration of the shield is unsatisfactory, the headlight will produce reflections which interfere with the vision of drivers in the oncoming traffic. Shields whose internal surfaces are provided with strips or coats of opaque material are unsatisfactory for another reason; namely, the opaque material destroys a substantial percentage of light which issues from the low beam filament so that such light cannot be used for illumination of the lane in which the vehicle travels. The opaque material is often unable to stand very high temperatures which develop in headlights utilizing halogen lamps; any damage to or destruction of such opaque coatings can result in reflection of light which causes undesirable glare.

SUMMARY OF THE INVENTION

An object of the present invention is to provide a novel and improved headlight for use in automotive vehicles or the like and to provide the headlight with novel means for reducing or eliminating glare by low beam light.

Another object of the invention is to provide a headlight which can produce intensive low beam light without interfering with the vision of drivers in the oncoming traffic.

A further object of the invention is to provide a novel shield for use in combination with the low beam filament of a headlight for automotive vehicles or the like.

An additional object of the invention is to provide a shield which can be used in headlights employing halogen lamps.

The improved headlight comprises a cupped reflector, a filament which preferably constitutes the low beam filament and is coaxially mounted in the reflector forwardly of the focal point, and a shield having a preferably strongly light-reflecting internal surface and flanking the filament from below and at both sides. The curvature of any given increment of a line representing the cross section of the shield in a plane which is normal to the optical axis of the reflector is such that it exceeds the curvature of a circle which is plotted through the particular increment and has its center located on a vertical line intersecting the optical axis, but such curvature is less than the curvature of a parabola plotted through the same increment and having its focus on the vertical line. The center of the circle is located at the level of or above the optical axis, and the focus of the parabola is located at the level of or below the optical axis.

In accordance with another feature of the invention, the curvature of each increment of a line representing the cross section of the shield in a plane which includes the axis of the filament exceeds the curvature of an ellipse which is plotted through any given increment and whose foci respectively coincide with the lowermost point at the foremost end and with the uppermost point at the rearmost end of the filament.

The novel features which are considered as characteristic of the invention are set forth in particular in the appended claims. The improved headlight itself, however, both as to its construction and the mode of utilizing the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
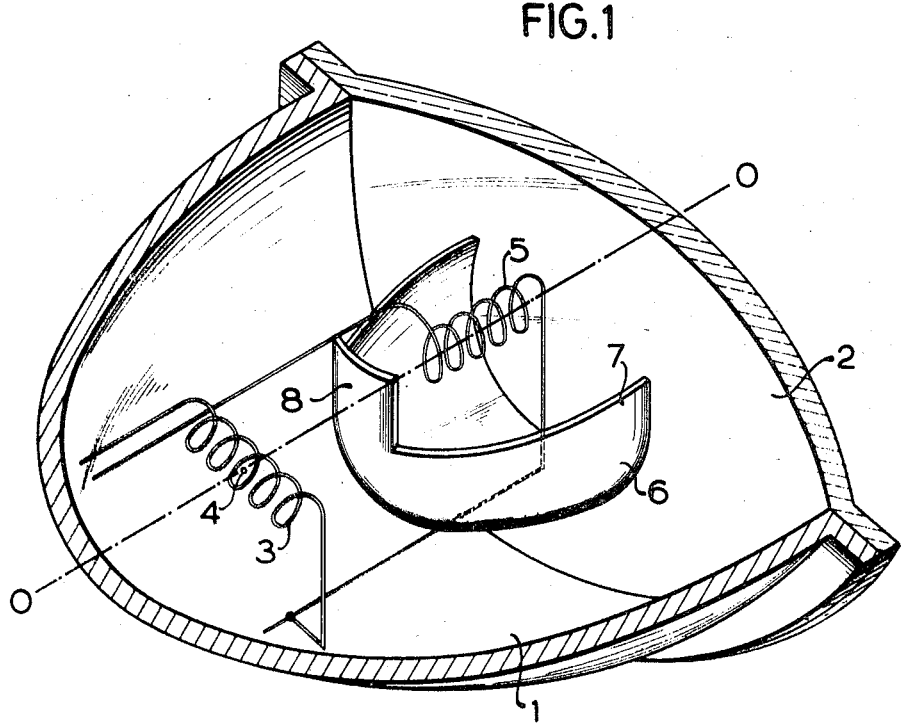
FIG. 1 is a perspective horizontal sectional view of a headlight which embodies the invention.

FIG. 1 illustrates a portion of a headlight for automotive vehicles which comprises a cupped reflector 1, a light dispersing lens 2 extending across the open front end of the reflector, a low beam filament 5 whose axis coincides with the optical axis 0—0 of the reflector, a high beam filament 3 whose axis is normal to the optical axis 0—0 and passes through the focal point 4 of the reflector 1, and a novel shield 6 which spacedly surrounds both sides and the lower part of the low beam filament 5. If desired, the high beam filament 3 can be positioned in such a way that its axis coincides with the optical axis 0—0, or the filament 3 can be replaced by a substantially U-shaped filament which surrounds the focal point 3. The purpose of the shield 6 is to reflect light which issues from the low beam filament 5 toward the upper half of the reflector 1. At least that portion of the material of the shield 6 which is adjacent to its internal surface consists of strongly light-reflecting material.

Figure 2:
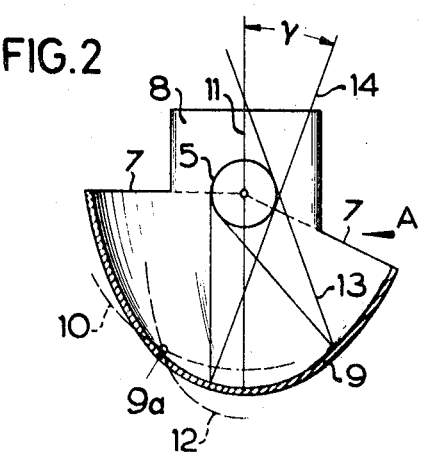
FIG. 2 is a transverse vertical sectional view of the shield and low beam filament in the headlight of FIG. 1.

The numeral 7 denotes the upper edge of the shield 6; the position of this upper edge is selected in such a way that the low beam filament can illuminate the entire upper half of the reflector 1. The rear portion of the shield 6 comprises an upwardly extending projection or lug 8 which extends upwardly and beyond the optical axis 0—0 and whose width is selected in such a way that light issuing from the filament 5 cannot impinge on the high beam filament 3. The edge 7 is rather sharp for reasons discussed in the copending application Ser. No. 784,795 of Lindae which is assigned to the same assignee. This is in contrast to conventional headlights wherein the upper part of the shield is provided with outwardly extending flanges or wings. Such wings are likely to produce reflected images which interfere with the vision of drivers in the oncoming traffic. The front end of the shield 6 is open, mainly for manufacturing reasons. FIG. 2 shows that the edge 7 at the left-hand side of the filament 5 extends substantially to the level of the axis of this filament and that the edge at the right-hand side of the filament 5 is located below such level. The reasons for such configuration are explained in the aforementioned copending application Ser. No. 784,795.

FIG. 2 is a section through the shield 6 taken in a vertical plane which is normal to the optical axis 0—0 as viewed in a direction from the front lens 2 toward the focal point 4 of the reflector 1. The double line 9 with hatching therebetween represents the cross section of the shield 6. Each point or increment 9a of this line 9 has a curvature which exceeds the curvature of a circle 10 (indicated by broken lines) but is less than the curvature of a parabola 12 (also shown by broken lines) whose focus is located on a vertical line 11 crossing the optical axis 0—0; such focus is disposed at the level of or below the optical axis, i.e., substantially at the level of or below the filament 5. The center of the circle 10 is located on the line 11 at or above the level of the optical axis which latter coincides with the axis of the low beam filament 5. The circle 10 and parabola 12 extend through the selected point or increment 9a of the line 9. Such configuration of the shield 6 insures that a light beam which issues from the filament 5 and impinges on the light-reflecting internal surface of the shield 6 intersects the vertical line 11 at a level above the axis of the filament 5 (see the beam 13) or that the reflected light beam makes with the vertical line 11 an angle gamma which is less than or at most equals 30° (see the light beam 14).

If a projection screen is placed in front of the lens 2, the reflected images of light beams 13 appear on the screen at a level below the corresponding image of the filament 5 so that such light beams cannot cause any glare. Reflected images of light beams 14 can be seen in the lower sector of the screen laterally at a level above the corresponding image of the filament 5; this again insures that the light beams 14 cannot cause glare to drivers in the oncoming traffic.

Figure 3:
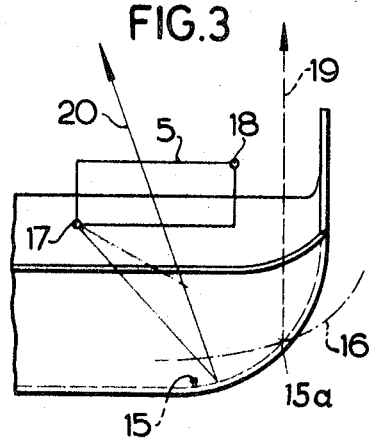
FIG. 3 is a side elevational view of the shield as seen in the direction of arrow A in FIG. 2.

FIG. 3 illustrates the shield 5 in a side elevational view as seen from the right-hand side of FIG. 2. The outline 15 of the shield 6 in a plane which includes the optical axis 0—0 has a predetermined curvature, namely, the curvature of each point or increment of the line 15 is such that it exceeds the curvature of an ellipse 16 which passes through the same point or increment and whose foci are shown at 17, 18. The focus 17 is located at the lowermost point of the front end of the low beam filament 5 and the focus 18 is located at the uppermost point of the rear end of the filament 5. Thus, the focus 17 is located closer to the lens 2 than the focus 18. The broken-line light beam 19 indicates the manner in which the light is reflected on internal surfaces of conventional shields; this light beam 19 intersects the optical axis 0—0 in a region behind the filament 5, i.e., rather close to the focal point 4 of the reflector 1. If a projection screen is placed in front of the lens 2, the light beam 19 produces on such screen an image at a level above the corresponding image of the low beam filament so that it causes glare to drivers in the oncoming traffic. The line 20 indicates the manner in which a light beam issuing from the filament 5 and impinging on the shield 6 is reflected on the internal surface of this shield. On a projection screen, the image of the beam 20 is located below the corresponding image of the filament 5 so that the beam 20 cannot produce glare.

An important advantage of the improved headlight is that it can employ a shield with a highly light-reflecting internal surface and that such surface cannot produce glare which would interfere with the vision of drivers in the oncoming traffic. The improved shield can be used with particular advantage in headlights which employ halogen lamps. The light output of halogen lamps is so high that the reflected images increase the intensity of illumination at a level above the light-dark boundary to such an extent that a headlight wherein the low beam light is produced by a halogen lamp cannot be used in two-way traffic unless the headlight embodies the improved shield. As a rule, the shield 6 will be installed in the interior of the glass envelope in a halogen lamp; this prevents the development of reflected images on the cylindrical quartz guns of halogen lamps.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

We claim:

1. In a headlight for automotive vehicles or the like, a combination comprising a cupped reflector having an optical axis and a focal point on said axis; a filament coaxially mounted in said reflector forwardly of said focal point; and a shield having a light-reflecting internal surface and flanking said filament from below and at both sides, the curvature of any given increment of a line representing the cross section of said shield in a plane which is normal to said optical axis being such that it exceeds the curvature of a circle but is less than the curvature of a parabola plotted through such increment, the center of said circle and the focus of said parabola being located on a vertical line intersecting said optical axis and said center and said focus being respectively located at least and at most at the level of said optical axis.

2. A combination as defined in claim 1, wherein said filament has front and rear ends and wherein the curvature of any given increment of a line representing the cross section of said shield in a plane including said optical axis exceeds the curvature of an ellipse plotted through such increment and having first and second foci respectively coinciding with the lowermost point at the front end and with the uppermost point at the rear end of said filament.

3. A combination as defined in claim 1, wherein said shield is provided with a pronounced edge.

4. A combination as defined in claim 1, wherein said filament is a low beam filament and further comprising a high beam filament mounted in said reflector in the region of said focus point, said shield having an extension projecting upwardly between said filaments.

5. A combination as defined in claim 1, wherein said shield has an open front side.

6. A combination as defined in claim 1, wherein at least that portion of said shield which is adjacent to said internal surface consists of strongly light-reflecting material.

7. A combination as defined in claim 1, wherein said filament forms part of a halogen lamp having an envelope of vitreous material and wherein said shield is mounted in the interior of said envelope.

8. A combination as defined in claim 1, wherein said shield includes two lateral portions one of which extends upwardly to a level above the other lateral portion.

9. A combination as defined in claim 8, wherein said one lateral portion has an edge located in a horizontal plane including said optical axis.

10. A combination as defined in claim 1, wherein said shield is positioned in such a way that the filament directly illuminates the upper half of said reflector.